Aug. 15, 1961  G. F. ABBOTT, JR  2,996,248
SUPERVISORY SYSTEM FOR AN ELECTRONIC COUNTER
Filed Dec. 31, 1957  2 Sheets-Sheet 1
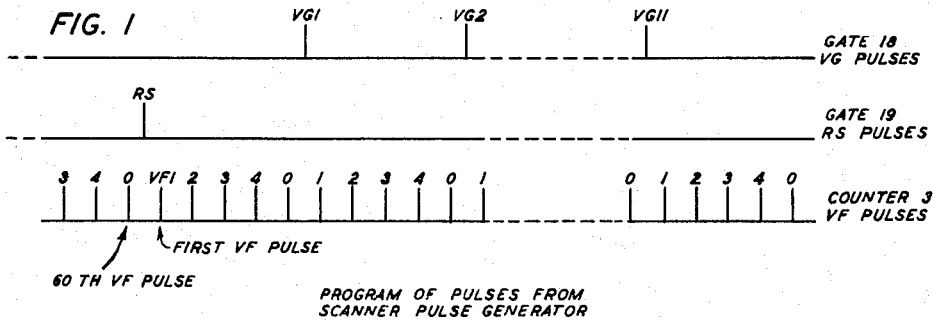
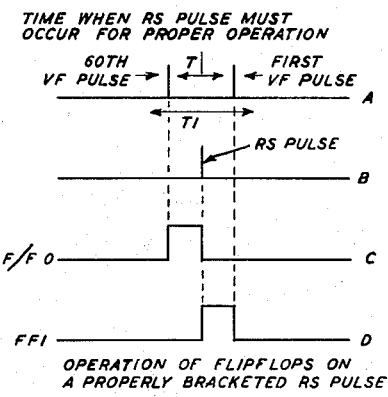
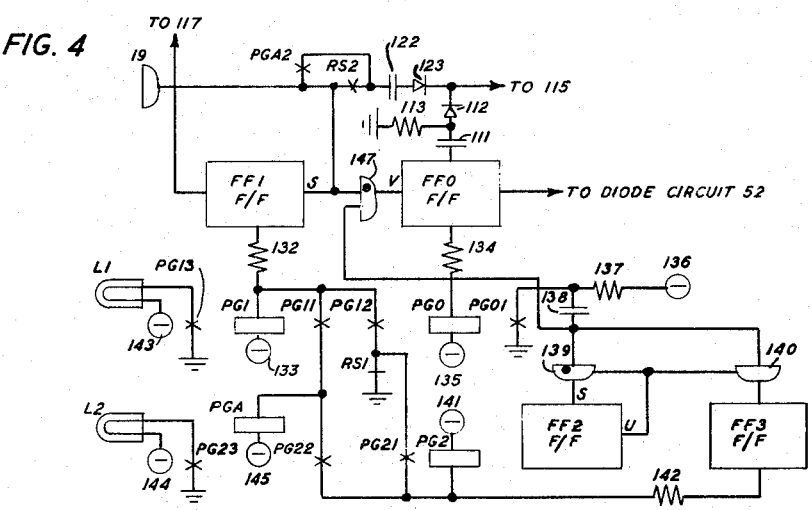
INVENTOR
G. F. ABBOTT, JR
BY
Harold C. Herman
ATTORNEY Aug. 15, 1961  G. F. ABBOTT, JR  2,996,248
SUPERVISORY SYSTEM FOR AN ELECTRONIC COUNTER
Filed Dec. 31, 1957  2 Sheets-Sheet 2

INVENTOR
G. F. ABBOTT, JR.
BY
Harold C. Herman
ATTORNEY

United States Patent Office 2,996,248
Patented Aug. 15, 1961

2,996,248
SUPERVISORY SYSTEM FOR AN
ELECTRONIC COUNTER
George F. Abbott, Jr., Pearl River, N.Y., assignor to
Bell Telephone Laboratories, Incorporated, New York,
N.Y., a corporation of New York
Filed Dec. 31, 1957, Ser. No. 706,401
33 Claims. (Cl. 235—153)

This invention relates generally to signaling systems and more particularly to methods for detecting the malfunctioning of operational counters utilized in such systems.

In present day signaling systems, such as automatic telephone and computer systems, continuous effort is being expended to improve operating reliability. These efforts have been directed in part to the improvement of the reliability of electronic counting devices which find ready application in such systems. The function of an electronic counting device is primarily to receive information in the form of discrete pulses fed thereto and to accumulate the same. The individual pulses received by the counting device are operable to set the stages of the counter in a predetermined order which is indicative of the accumulation. Present day electronic counting devices find wider application than the mere counting of serially arranged pulses as they are used, in many instances, to develop a sequence of control pulses bearing a predetermined relationship to one another. The control pulses are operable to control associated apparatus.

Various methods have been developed to supervise and monitor the operation of electronic counting devices. These methods generally are of two classes. Into the first of these classes fall those methods which require a complete duplication of the counting equipment. In such arrangements, the pulses to be counted are fed simultaneously to at least two identical counting chains which are arranged in parallel relationship. The outputs of these counters are compared upon the completion of the counting operations and any discrepancy therebetween is indicative of a malfunction in one of the parallel counters. Limitations are present in such methods as each of the separate counters may be affected in an identical manner by extraneous forces, such as radioactivity, power surges and the like, which would allow for an improper count by both counters such that a malfunction may not be detected by a comparison of outputs. Moreover, the duplication of the main counting chain to provide for a monitoring chain may entail great expense which may deter the use of supervised operational counters in some of the less expensive equipments. Into the second of these classes fall those methods wherein the information data is processed twice by the same equipment and the outputs of each processing operation are compared. Such methods have an intrinsic limitation in that twice the time of the operation of the device is required since the counting sequence must be repeated to provide a comparison. Also additional equipment must be provided so that the information supplied by the first counting operation may be stored for comparison with the information of the second counting operation. Moreover, a malfunction of the counter itself may be repeated to improperly count in both sequences whereby the outputs may be identically erroneous. A comparison of such outputs would not detect an error in the counter operation.

An object of this invention is to provide a more efficient, economical and reliable method for supervising and monitoring the operation of an electronic counting device.

Another object of this invention is to provide for the detection of any malfunction in a counting device by comparing a portion of the counting sequence against a counter which is responsive to the same series of pulses but has fewer counting stages.

A further object of this invention is to provide for a monitoring system which is effective to indicate the complete failure of an electronic counting device and which is also effective to distinguish between temporary failures and permanent failures.

Still another object of this invention is to provide a supervisory counter which will be affected differently than the main counter by extraneous forces acting thereon.

A further object of this invention is to resynchronize the operation of the main counter and the supervisory counter upon the detection of a failure in either of the counters.

The present invention contemplates means for monitoring the operation of a cyclic counter which is used to develop operational pulses having a predetermined relationship to the serially arranged pulses to which the counter is responsive. The monitoring of this counter is accomplished by means of a supervisory counter which is responsive to the same or a similar train of serially arranged pulses as the main or monitored counter. The main counter and the supervisory counter each comprise a different number of bistable electronic devices which count a train of serially arranged pulses and, which in combination with appropriate gating circuits, develop an output pulse upon the count of a predetermined number of the serially arranged pulses. The bistable devices of the main counter are arranged in tandem as a ring-type or scaler-type counter, while the bistable devices of the supervisory counter are arranged to count in the binary system of notation. The main counter and the supervisory counter, therefore, have a different radix of operation. Means are provided for synchronizing both the main counter and the supervisory counter at the end of each counting operation in preparation for a subsequent count.

A feature of this invention relates to the provision of a supervisory counter which has a counting sequence different from that of the supervised counter. By utilizing a different counting sequence, the effect of extraneous forces, such as radioactivity, power surges and the like, is different in each of the counters. The proper occurrence of the output pulses developed by each of the counters is determined by a comparison circuit which is effective to operate an alarm device when the occurrence of the pulses are improper. The comparison circuit comprises two bistable circuits which monitor the output pulses of the counters, each of which has an operative and an inoperative state. One of the bistable circuits is placed in its operative state by the presence of a pulse developed upon the completion of a count by the supervisory counter. The circuit remains in this state until placed in an inoperative state by a pulse developed by the completed count of the main counter which also operates to place the second of the bistable circuits in an operative state. The second circuit remains in its operative state until the supervisory counter is recycled, at which time it is made ineffective to operate the alarm device. The alarm device is actuated through the agency of either of the two circuits but only after a time delay equal to at least the time between the occurrence of the pulse developed by the supervisory counter at the end of its counting operation and the initiation of its next counting sequence.

Another feature of this invention pertains to the provision of an alarm circuit which is operated if the time position of one pulse is improper as compared to two pulses in a train of pulses. By monitoring the pulse in this manner, its displacement or absence is detected.

Still another feature of this invention is the provision of an alarm circuit which comprises two bistable circuits each of which is operable to actuate the alarm device if the relative positions of the pulses developed by the main counter are improper.

Still another feature of this invention is the provision of a reset device operable in response to the actuation of an alarm indicating device to resynchronize the operation of the main counter and the supervisory counter.

A further feature of this invention is the provision of an alarm system capable of distinguishing between a temporary failure and a permanent failure occurring in the main counter. When a failure is first detected, the main and the supervisory counters are resynchronized. If the failure occurs again during the next counting sequence, a permanent failure indication is provided.

The foregoing objects and features of applicant's invention will become more apparent to one skilled in the art from the detailed description of the specific embodiment when considered with the drawings in which:

FIG. 1 is a diagram showing the relative occurrences and the proper sequence of the operational pulses developed by the main counter;

FIG. 2 is a diagram showing the sequence of occurrence of the pulses provided by the main counter and the supervisory counter which are compared in the comparison circuit;

FIG. 4 is a circuit representation of a modification of the system shown in FIG. 3.

Figure 3:
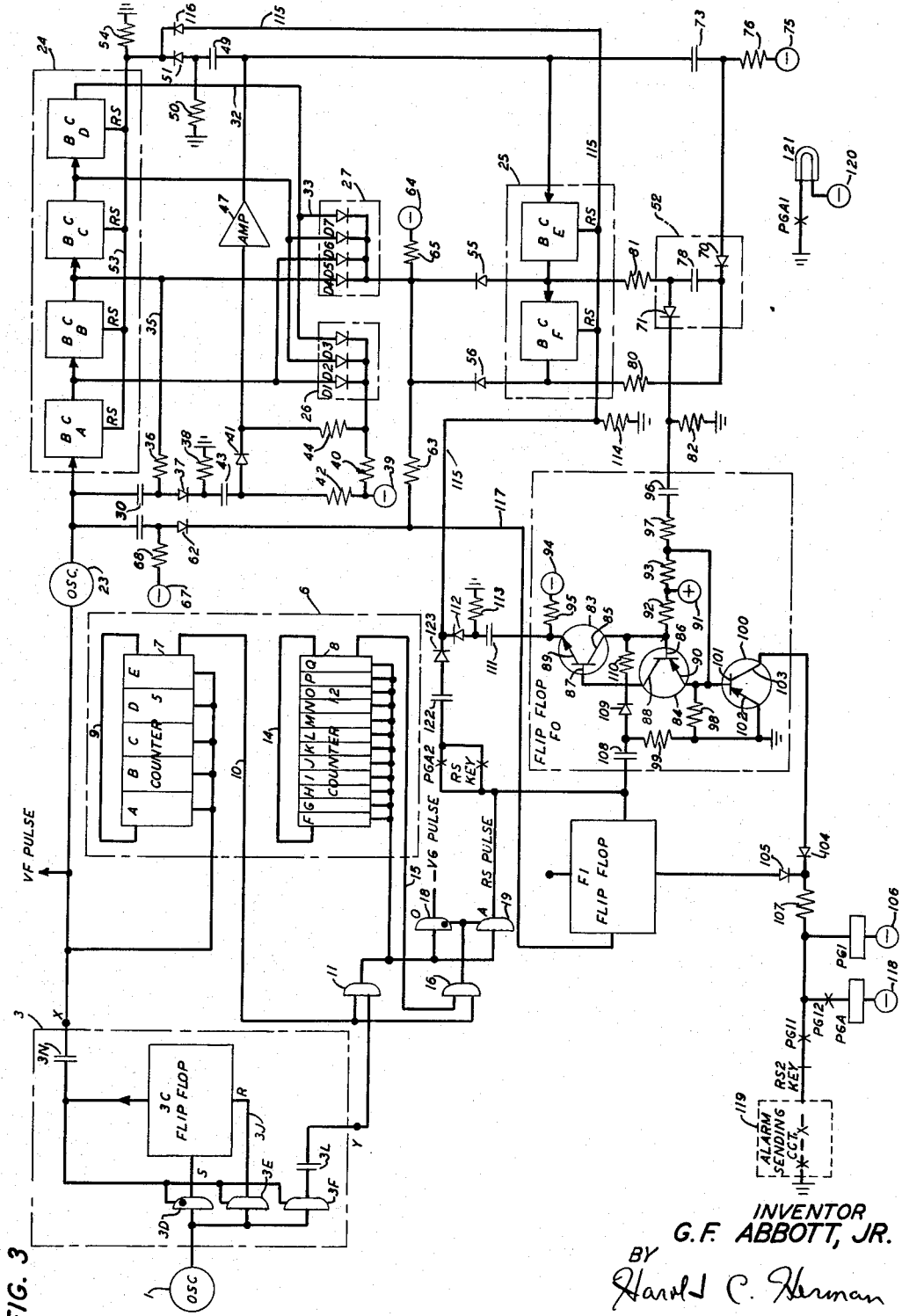
FIG. 3 is a circuit representation of the alarm system of this invention.

Making specific reference to FIG. 3, a pulse source 1 is shown which provides a serially arranged train of pulses to a system from which operational pulses, depicted in FIG. 1, are derived. The system which is used for the development of the operational pulses is of the type disclosed in United States Patent 2,812,385 issued to A. E. Joel, Jr., et al. on November 5, 1957. The pulses developed by the pulse source 1, which are positive, are directed to a binary counter 3. The binary counter 3, which is part of the system deriving the operational pulses, produces at its two output terminals X and Y a train of serially arranged positive pulses.

The binary counter 3 comprises a conventional bistable device 3C in combination with an inhibiting gate 3D and two enabling gates 3E and 3F. The pulse source 1 simultaneously supplies the positive pulses to the inputs of the inhibiting gate 3D and the enabling gates 3E and 3F. The bistable device 3C has a low conduction state and a high conduction state and is responsive to the pulse from the pulse source 1 to transfer from either state to the other. The gates 3D, 3E and 3F are controlled by the bistable device 3C as the control terminals of the gates 3D, 3E and 3F are connected to the output terminal of the device 3C. When the device 3C is in its low conduction state, the gate 3D passes the pulse from pulse source 1 to the set terminals to transfer the bistable device 3C to its high current or operated state. The pulse is blocked at the enabling gates 3E and 3F. When the bistable device 3C is operated, it disables the gate 3D and enables the gates 3E and 3F. With the gates 3E and 3F enabled the next pulse from the pulse source 1 passes therethrough. The output of the enabling gate 3E is connected to the reset terminal R of the device 3C and is effective to reset or to transfer the state of operation thereof back to its low conduction state. The output of the enabling gate 3F is connected to the output terminal Y through a coupling capacitor 3L. When the bistable device 3C is reset, it removes the inhibiting voltage from the gate 3D so that a subsequent pulse from the pulse source 1 sets or retransfers the operation of the bistable device 3C. The output from the device 3C is directed through a coupling capacitor 3N to the output terminal X. In this manner every time the device 3C is operated it provides a pulse at terminal X, and each time the device 3C is reset a pulse is provided at terminal Y.

The output trains of pulses of the bistable or binary counter device 3, which are present on the output terminals X and Y, are both of positive polarity and have a repetition frequency equal to one-half of the repetition frequency of the serially arranged train of pulses developed by the pulse source 1. The pulses at terminals X and Y correspond in time to every other pulse of the serially arranged train of pulses developed by the pulse source 1 due to the action of the binary counter 3. The pulses at the output terminal X are directed to a counter arrangement 6 which comprises two ring or cyclic counters 7 and 8. The cyclic counters 7 and 8 are jointly operative to produce a single reference pulse for each 60 pulses of the train of pulses at terminal X. Ring counters 7 and 8 may be of the type described in the above-mentioned A. E. Joel, Jr., et al. patent. The counter 7 is adapted to cyclically count five pulses and the ring counter 8 is adapted to cyclically count 12 cyclic operations of ring counter 7 for a total count of 60. As is hereinafter described, the completion of a cyclic operation by counter 8 is productive of a reference pulse. Ring counter 7 comprises five bistable stages A, B, C, D and E which are arranged in tandem. A bistable stage or device, as indicated above, is one which has two equilibrium conditions and can be directed or transferred from one equilibrium condition to the other. There are numerous bistable devices well known in the art which may be used as the counting stages and some are disclosed in the above-identified patent to A. E. Joel, Jr. et al.

The operation of counter 7 is such that the train of positive pulses cyclically conditions the stages A through E. The stages A through E are mutually connected and interdependent. For a stage to assume a count position, the preceding stage must be operated and a pulse present at terminal X. When a stage is set or operated, it enables the succeeding stage. The effect, therefore, of the train of pulses from the output terminal X is to successively step the count position in the counter 7. The fifth stage E enables the first stage A through a conductor 9 to provide for the cycling operation of the counter 7.

An output pulse is directed from the stage E of the counter 7 along the conductor 10 to an AND gate 11 each time the stage is in a count position. The output pulse is therefore indicative of a cyclic operation, or a count of five, by the counter 7. The AND and the OR gates described herein may be of conventional design and operate in a manner well known in the art. An AND gate is defined as a circuit device having more than one input terminal which is operative only if all the input terminals are activated. An OR gate, on the other hand, is defined as a circuit device having more than one input terminal and operative if any but not all of these terminals are activated. The AND gate 11 remains inoperative on the presence solely of a pulse from stage E but becomes operative when a pulse is simultaneously directed thereto from the output Y of the binary counter 3. As was described above, the pulse appearing at output Y is delayed with respect to the pulse appearing at output X due to the operation of the binary counter 3. This delay results in the proper time relationship of the operational pulses which are developed and which are described hereafter with respect to FIG. 1. The presence of the pulses on the conductor 10 and at output Y causes the AND gate 11 to direct a pulse to the ring counter 8. The counter 8 comprises 12 bistable counting stages F, G, H, I, J, K, L, M, N, O, P and Q which are arranged in tandem. The pulses through the AND gate 11 successively step the count of ring counter 8 along the serially arranged counting stages F through Q. The operation of counter 8 is similar to that of counter 7 in that only one stage is in a count position at any time. In each of these counters, the stage of the highest order which is in a count position is indicative of the number of pulses counted. As the counter 8 is arranged to count the cyclic operations of counter 7, one cyclic operation of counter 8 is representative of 12 cyclic operations of the counter 7 or the count of 60 pulses in the serially arranged train of pulses directed from output X. The stage Q is connected to the stage F by means of the conductor 14. Upon each cyclic operation of counter 8, or when the stage Q has assumed a count position, an output pulse indicative thereof is fed back along conductor 14 to the stage F, or the first stage in counter 8, to recondition the counter for a subsequent counting operation.

The pulse from the stage Q of the counter 8 is also directed along a conductor 15 to an AND gate 16. Stage E of the counter 7 is also connected to the AND gate 16 by means of conductor 10. The AND gate 16 is operative only when pulses appear on each of the conductors 10 and 15. Each of the counters 7 and 8 applies a pulse from the counter stages E and Q, respectively, to AND gate 16 when a count of 60 is attained. The application of the two pulses to cause the AND gate 16 to operate and produce a pulse is, therefore, indicative of a count of 60 pulses by the counter 6.

As was hereinbefore stated, the train of pulses at the output terminals X and Y of the binary counter 3 do not appear simultaneously, but rather, correspond to alternate pulses in the train of pulses developed by the pulse source 1. The operation of the ring counter 8, therefore, is delayed with respect to the operation of ring counter 7 due to the agency of the AND gate 11 which is controlled by the train of pulses appearing at the output terminal Y. The output pulse of the AND gate 16, which is enabled by the pulse developed by the counting stage Q of counter 8, corresponds in time to the pulse appearing at the output terminal Y. The enabling of the AND gates 11 and 16 is, therefore, affected at a time which corresponds to the presence of pulses appearing at output Y. The effect is, therefore, that the output pulses of both the AND gates 11 and 16 appear in time intermediate the successive pulses of the serially arranged train of pulses developed at the output terminal X.

The output of the AND gate 11, which was described above as being responsive to the count position of stage E and the pulse from the terminal Y, is also directed to gate 18 and gate 19. The output of the AND gate 16, which is responsive to a count of 60 by counter 6, is also connected to gate 18 and gate 19. The presence of pulses through gates 11 and 16 is required to operate gate 19 but the presence of a pulse from gate 11 and the absence of a pulse from gate 16 is required to operate the gate 18. Gate 18 is thus functionally an inhibiting gate in that the presence of a control pulse prevents it from operating. As the pulses developed from AND gates 11 and 16 are delayed with respect to the pulses appearing at output X and the AND gates 11 and 16 control the operation of gate 18 and gate 19, the outputs of gate 18 and gate 19 are correspondingly delayed in time with respect to the pulses which appear at the output terminal X. The gate 18 and the gate 19 are operable to develop the operational pulses which are monitored and which are shown in FIG. 1.

The counting system which has been described above is of a type which finds ready application in automatic telephone equipment. The system described above is capable, for example, of supplying the operational pulses required in a line concentrator type telephone system of the type disclosed in the above-identified A. E. Joel, Jr. et al. patent. The operational pulses utilized in this system are referred to as vertical file pulses, vertical group pulses and reset pulses. In FIG. 3, the vertical file pulses are produced by the binary counter 3, the vertical group pulses by the gate 18 and the reset pulses by the gate 19. The reset pulses insure a proper synchronization for the operation of the system. As shown in FIG. 1, the reset pulse RS corresponds in time to the would be first pulse VG0 in the series of vertical group pulses VG1 through VG11, or to a count of 60 by the counter 6. The vertical group pulses VG1 through VG11 occur between two vertical file pulses VF0 and VF1. The relative position of the vertical group pulses to the vertical file pulses is due to the relative position of the trains of pulses which appear at the output terminals Y and X of the binary counter 3. Between successive vertical group pulses, five vertical file pulses occur. The relative position of these pulses is important in the operation of the line concentrator system.

In the operation of applicant's monitoring system, the vertical file pulses, which are developed by the binary counter 3 and appear at output X, are directed to an oscillator 23. The oscillator 23, which may be a conventional astable multivibrator, is capable of producing an output signal whose frequency is equal to that of the vertical file pulses. The oscillator 23 is synchronized by the vertical file pulses which appear at output X. The oscillator 23 functions to supply a train of pulses to a binary counter 24 and will actuate an alarm device should there be a complete failure of the pulse source 1. The output of oscillator 23 is directed to the binary counter 24 which consists of four digit counter stages BCA, BCB, BCC and BCD. Each of the stages BCA through BCD is bistable having two stable states of operation. The counter 24 has an operating cycle during which 15 pulses are counted in binary notation. Associated with the counter 24 is another binary counter 25 which consists of two digit counter stages BCE and BCF. Binary counter 25 is capable of counting four pulses in binary notation. The counter 25 is responsive to an information pulse which is produced when the binary counter 24 completes one cyclic operation. As the operation of counter 25 is in conjunction with counter 24, 60 pulses developed by oscillator 23 may be counted by each cyclic operation of the counter 25 since 15 pulses, which are counted by binary counter 24, are counted four times by the binary counter 25.

At the beginning of the counting operation of the counter 24, the digit counter stages BCA, BCB, BCC and BCD are each in a no-count position or a set "0" position. The pulses which are developed by oscillator 23 are directed to the first digit counter BCA corresponding to the lowest counting order of counter 24. This pulse causes all four stages BCA through BCD to assume a count or a set "1" position. The stages of the binary counter 24 are designed so that a positive pulse appearing at the input of the stage is operable to change the state of operation therein. A positive pulse is produced whenever a stage in the counter 24 is transferred from a no-count to a count state or a set "0" to a set "1" position. The second pulse in the train of pulses to be counted will be effective to transfer the digit counter BCA from a set "1" to a set "0" position. This transfer by digit counter BCA from a set "1" to a set "0" position will not be productive of a positive pulse at its output and will, therefore, not affect the digit counter stages BCB, BCC and BCD. The third pulse in the series of pulses to be counted will cause digit counter stage BCA to again transfer its state of operation from a set "0" to a set "1" position. This transfer of the state of operation by digit counter stage BCA, as it is from a set "0" to a set "1," is productive of a positive pulse which when applied to digit counter stage BCB is operable to cause the stage to transfer its state of operation from a set "1" to a set "0" position. A change in the state of operation by each of the digit counter stages BCB, BCC and BCD, accordingly, is had whenever their respective preceding stages transfer from a set "0" to a set "1." This sequence of operation follows through so that each pulse received by the digit counter 24 is effective to change the combination of the states of operation of the four digit counters BCA through BCD, which combination is indicative of the number of pulses counted. In the sequence of operation of counter 24, the digit counter stages BCA through BCD will each be transferred to a set "0" position upon fifteen pulses being counted. The sequence of operation of counter 24 is, therefore, as follows:

| Pulses Counted | A | B | C | D |
|---|---|---|---|---|
| 1 | 1 | 1 | 1 | 1 |
| 2 | 0 | 1 | 1 | 1 |
| 3 | 1 | 0 | 1 | 1 |
| 4 | 0 | 0 | 1 | 1 |
| 5 | 1 | 1 | 0 | 1 |
| 6 | 0 | 1 | 0 | 1 |
| 7 | 1 | 0 | 0 | 1 |
| 8 | 0 | 0 | 0 | 1 |
| 9 | 1 | 1 | 1 | 0 |
| 10 | 1 | 1 | 1 | 0 |
| 11 | 1 | 0 | 1 | 0 |
| 12 | 0 | 0 | 1 | 0 |
| 13 | 1 | 1 | 0 | 0 |
| 14 | 0 | 1 | 0 | 0 |
| 15 | 0 | 0 | 0 | 0 |

Associated with the counter 24 are diode circuits 26 and 27. The diode circuit 26 is composed of diodes D1, D2 and D3 and the diode circuit 27 is composed of diodes D4, D5, D6 and D7. The anodes of diodes D1 and D5 are connected to the output of digit counter stage BCA. The anodes of diodes D2 and D6 are connected to the output of digit counter stage BCC. The anodes of diodes D3 and D7 are connected to the output of the digit counter stage BCD. The anode of diode D4 is connected to the output of the digit counter stage BCB and through a resistor 36 to the anode of a diode 37, the cathode of which is connected to ground through resistor 38. The anode of diode 37 is connected through coupling capacitor 30 to the output of oscillator 23. Diode 37 functions as an enabling gate. The diode 37 is reverse biased due to a negative biasing voltage which appears at the output of digit counter stage BCB when in a set "0" position and which is applied to the anode thereof through resistor 36. For diode 37 to be conductive, it is, therefore, necessary that the digit counter stage BCB be in a set "1" position so that a less negative potential may be supplied to the anode of diode 37. The simultaneous application of the less negative potential from the digit counter stage BCB and the positive output pulse from oscillator 23 through capacitor 25 is effective to allow conduction in the diode 37. The conduction of the diode 37 allows the pulse developed by oscillator 23 to be applied to the anode of diode 41 through capacitor 43.

The diode 41 in combination with the diode circuit 26 acts as an inhibiting gate for the pulse which is conducted by the diode 37. If the circuit of each of the diodes D1, D2 and D3 be traced, it is evident that the outputs of the digit counter stages BCA, BCC and BCD are each connected to the cathode of diode 41. The output of the digit counter stage BCA is connected thereto through the diode D1 and resistor 44. The output of the digit counter stage BCC is connected thereto through the diode D2 and resistor 44. The output of the digit counter stage BCD is connected thereto through the diode D3 and resistor 44. The negative voltage source 39 is connected to the anode of diode 41 through the resistor 42. The same negative voltage 39 is connected through resistor 40 to the cathodes of diodes D1, D2 and D3 and, in turn, to the cathode of diode 41 through resistor 44. From the above-described arrangement, the diode 41 will be properly biased, due to the application of an equal negative voltage from source 39 to the cathode and plate thereof, to conduct the positive pulse passed by the diode 37, which is connected by the coupling capacitor 43 to the plate of diode 41.

The operation of the inhibiting gate which comprises diode 41 in combination with diode circuit 26 will be readily understood if reference is made to the above table which shows the sequence of operation of the digit counter 24 and particularly to the operation of the digit counter stages BCA, BCC and BCD. It is evident that in a count from 1 to 13 by the binary counter 24, a positive pulse is applied to at least one of the diodes in the diode circuit 26. The positive pulse is developed due to the respective digit counter stage assuming a set "1" condition. A positive pulse applied to the anode of any one of the diodes D1, D2, or D3 will, therefore, cause that diode to conduct and apply a less negative voltage to the cathode of diode 41. The presence of this voltage on the cathode of diode 41 will reduce the effect thereon of the voltage applied by battery 39 and will be sufficient to reverse bias the diode 41. The result will be to inhibit the passage of a pulse through diode 41 when any of the digit counter stages BCA, BCC or BCD are in a set "1" position. Accordingly, at the count of 14 by the binary counter 24, the diodes 37 and 41 are both in condition to conduct a positive pulse. At the count of 14 by the counter 24, the digit counter stage BCB is in a set "1" position and a positive pulse is directed therefrom through the resistor 36 to enable the diode 37. At this same count position, the digit counter stages BCA, BCC and BCD are in a set "0" position. Therefore, due to the effect of the counter 24 having counted 14, both diodes 37 and 41 are operative to conduct the 15th positive pulse developed by oscillator 23 to the amplifier 47.

The amplifier 47 serves the dual function of providing the reset pulse to the binary counter 24 and also counting information to the binary counter 25. The amplifier 47 may be of a conventional design and of a type well known in the art. It is operative to supply at its output a positive voltage pulse which corresponds to the fifteenth pulse counted by the digit counter 24. The output pulse of the amplifier 47 is directed through the coupling capacitor 49 across resistor 50 to ground. The voltage developed by this pulse across the resistor 50 is applied to the anode of diode 51 and is sufficient to cause conduction therein. The cathode of the diode 51 is connected by the conductor 53 to each of the digit counter stages BCA, BCB, BCC and BCD and to the resistor 54 which is connected to ground. The voltage developed across the resistor 54 by the pulse passed through diode 51 is sufficient to reset each of the digit counter stages BCA through BCD to a set "0" position.

The operation of the binary counter 24 is, therefore, of a cyclic nature due to the diode arrangement 26 which operates in conjunction with diodes 37 and 41 to develop a reset pulse through the agency of amplifier 47. The reset pulse, which is developed by amplifier 47 and used to reset the binary counter 24, is also used to supply count information to the binary counter 25 so that this counter will be operable to count each cyclic operation to the counter 24.

The binary counter 25 is composed of two digit counter stages BCE and BCF, each of which is bistable. The count information pulses developed through the agency of the amplifier 47 are directed to the input of the digit counter stage BCE. The sequence of operation of the binary counter 25 is as follows:

| No. of Count | Count by Counter 24 | E | F |
|---|---|---|---|
| 1 | 15 | 1 | 1 |
| 2 | 30 | 0 | 1 |
| 3 | 45 | 1 | 0 |
| 4 | 60 | 0 | 0 |

The operation of the binary counter 25 is similar to that of the binary counter 24. The presence of the positive going pulse from the amplifier 47 is sufficient to establish a count or a set "1" position in each of the digit counter stages BCE and BCF. The state of digit counter BCF will be transferred only if there is a change from a set "0" to a set "1" position by the digit counter stage BCE in response to the serially fed information pulses from the amplifier 47. Making specific reference to the above table, the second pulse in the serially arranged train of count information pulses will be effective to transfer the digit counter stage BCE to a set "0" position but will not affect the state of the digit counter stage BCF. The third pulse in the train of information pulses will be effective to change the state of the digit counter stage BCE to a set "1" position and, as this is productive of a positive going voltage pulse from the output of digit counter stage BCE to the input of the digit counter stage BCF, the digit counter stage BCF will be transferred to a set "0" position. The fourth pulse in a train of information pulses will be effective to transfer the state of the binary counter BCE to a set "0" position, and will not affect the state of operation of the binary counter BCF. The return of both of the digit counters BCE and BCF to a set "0" position is indicative of a count of 60 pulses in that train of pulses developed by the oscillator 23 and directed to the binary counter 24.

Associated with the binary counter 25 is a diode circuit 52 which comprises the diodes 70 and 71. The cathode of the diode 70 is serially connected through the coupling capacitor 78 to the anode of the diode 71. The count information pulse, which is developed through the agency of the amplifier 47 and directed to the binary counter 25, is also directed through the coupling capacitor 73 to the anode of diode 70. A negative voltage source 75 is arranged to apply through the resistor 76 a negative voltage at the junction of the coupling capacitor 73 and the anode of the diode 70. The junction of the coupling capacitor 78 and the cathode of diode 70 is connected through the resistor 80 to the output of the digit counter stage BCF. The junction of the coupling capacitor 78 and the anode of diode 71 is connected through the resistor 81 to the output of the digit counter stage BCE. The cathode of diode 71 is connected to ground through the resistor 82. The diode circuit 52 is operative to conduct a pulse whenever the digit counter stage BCE is in a set "1" position and the digit counter stage BCF is in a set "0" position. The operation of the diode gating circuit 52 is such that the diode 70 is normally reverse biased due to the voltage applied to the anode thereof from the voltage source 75. When the digit counter stage BCF is in a set "0" position, negative biasing voltage therefrom is applied to the cathode of the diode 70 through the resistor 80. As the biasing voltage is of a negative polarity, the cathode and anode of diode 70 will be equally biased. Whenever the digit counter BCE is in a set "0" position, negative biasing voltage therefrom is applied to the anode of diode 71 through resistor 81 to reverse bias the diode. However, the voltage applied to the anode of the diode 71 will be less negative and approaching ground whenever the digit counter stage BCE is in a set "1" position and will result in a removal of this reverse biasing voltage. Therefore, a pulse developed by amplifier 47 will only be conductive through the diode circuit 52 whenever both of the diodes 70 and 71 are not reverse biased, which only occurs when the digit counter BCE is in a set "1" position and the digit counter BCF is in a set "0" position. The conduction of a pulse through the diode circuit 52 applies this pulse across the resistor 82.

The operation of an inhibiting gate including diode 62 is also dependent upon the operation of the binary counter 25 which operates in conjunction with the diode circuit 27. The diode circuit 27, as was described above, comprises diodes D4, D5, D6 and D7. The cathodes of each of the diodes D4, D5, D6 and D7 are connected through the resistor 63 to the cathode of diode 62. Associated with the diode circuit 27 are diodes 55 and 56, the anodes of which are respectively connected to the outputs of the digit counter stages BCE and BCF. The cathodes of the diodes 55 and 56 are also connected to the cathode of diode 62 through resistor 63. A negative voltage source 64 is connected through resistor 65 to the junction of the resistor 63 and the cathodes of diodes 55 and 56 and those contained in the diode circuit 27. The voltage applied from source 64 to the cathode of diode 62, which is of equal magnitude as the voltage applied from a source 67, is effective to neutralize the reverse biasing effect of the voltage supplied from the negative voltage source 67 applied to the anode of diode 62 through resistor 68. As each of the plates of the diodes D4, D5, D6, D7, 55 and 56 are each respectively connected to the outputs of the digit counter stages BCA, BCB, BCC, BCD, BCE, and BCF, the operation of any of the digit counter stages in a set "1" position will effectively apply a less negative potential to the anode of its respective diode and cause it to become forward biased. This will result in conduction through the respective diode which will be effective to decrease the negative potential applied to the cathode of diode 62 and cause it to become reverse biased. From the above described operation, it is evident that the diode 62 will only be conductive if all of the digit counter stages BCA through BCF are in a set "0" position so that equal negative voltages will be applied to bias the cathode and the plate of diode 62. Referring to the above tables of operations of the binary counters 24 and 25, it is evident that this condition will only exist upon a completion of a count of 60 by the joint operation of counters 24 and 25.

From the above described operation of the diode circuit 52 and the diode 62, it becomes obvious that means are provided for the separation of the sixtieth pulse counted by the binary counters 24 and 25 and the first pulse in a subsequent series of 60 pulses to be counted. The pulse conducted by the diode circuit 52 corresponds to the sixtieth pulse counted due to the fact that the binary counter 25 must have counted three information pulses developed by amplifier 47 in response to three cyclic operations of binary counter 24 for diode circuit 52 to be conductive. Moreover, as was described above, the necessary requisite for conduction of a pulse through diode 62 is that each of the digit counter stages BCA through BCF must be in a set "0" position. This latter state will only occur whenever the binary counters 24 and 25 are in a position to count the first pulse in a series of 60 pulses.

The pulses which are directed through the diode circuit 52 and applied across the resistor 82 are directed to the flip-flop F0. The circuitry shown within the dotted enclosure of flip-flop F0 is identical to that circuit which is contained in the flip-flop F1. The flip-flop F0 comprises a bistable device which is operable in one of its two states of operation to actuate the alarm indicating device. The bistable device contained in flip-flop F0 comprises an n-p-n junction transistor 83 and a p-n-p junction transistor 84 which are arranged to form an equivalent transistor device. The adaptation of an n-p-n transistor and a p-n-p transistor to form a single equivalent transistor device is described in United States Patent 2,655,609 issued to W. Shockley on October 13, 1953. The collector 85 and the base 87 of the transistor 83 are electrically integral with the base 86 and the collector 88 of the transistor 84, respectively. By means of these connections, a three-terminal device is achieved whose mode of operation is similar to that of a single transistor device having a base electrode, an emitter electrode and a collector electrode. By analogy to a conventional transistor device, the emitter electrode 90 of the transistor 84 corresponds to the emitter of the transistor; the emitter 89 of the transistor 83 corresponds to the collector electrode of the conventional transistor; and the junction of the collector electrode 85 and the base electrode 86 corresponds to the base of the conventional transistor. The equivalent device hereinabove described will operate as a transistor having a current multiplication factor, or alpha, greater than one. The total alpha for this composite transistor is given by the expression:

$$\alpha_{total} = \frac{\alpha(pnp)}{1 - \alpha(npn)}$$

Since the composite transistor has an alpha which is greater than one, the circuit will exhibit negative resistance characteristics making it suitable for bistable operation.

The junction of the collector 85 and the base 86 is connected to a positive voltage source 91 through the resistor 92. A somewhat less positive biasing voltage is also supplied by the voltage source 91 to the emitter electrode 90 through the voltage divider composed of resistor 98 and resistor 93. A negative biasing potential is supplied by the voltage source 94 to the emitter electrode 89 through the resistor 95. The pulses which are developed by amplifier 47 in response to the counting operations of the binary counter 24 and directed through the diode circuit 52 are applied to the emitter electrode 90 of transistor 84 through the coupling capacitor 96 and resistor 97. The application of this positive pulse to the emitter electrode 90 will cause the transistor 84 to become forward biased and will initiate high conduction therein. The conduction of the transistor 84 will develop a collector current through the collector 88 which will be supplied as a base current to the transistor 83. This base current is sufficient to initiate conduction in the transistor 83. The conduction in the transistors 83 and 84 will cause a base current to flow through a regenerative feedback promoting impedance resistor 92. The emitter characteristics of the equivalent transistor device will accordingly display a negative resistance portion denoting a transition state of operation for the circuit. The flip-flop F0 has two stable operation points, i.e., a high conduction state and a low conduction state. The effect of the transistor operating with negative resistance characteristics is to cause the emitter voltage to become rapidly more negative. In the high conduction state, the current path of the emitter electrode 90 of the transistor 84 is from ground through transistor 100. The junction of resistor 98 and the emitter electrode 90 is connected to the base 101 of transistor 100. The transistor 100 is of a junction type and is shown connected in a grounded emitter configuration. The emitter electrode 102 of transistor 100 is connected directly to ground. The current into the electrode 101 will cause the transistor 100 to become forward biased to initiate conduction therein.

A negative voltage is supplied by the voltage source 106 to the collector electrode 103 of transistor 100 and to the corresponding collector electrode in flip-flop F1. This negative voltage is applied through relay PG1 and resistor 107, which are common to both flip-flop F0 and flip-flop F1, and from there through the diode 104 to the collector electrode 103 and to the corresponding collector electrode in the grounded-emitter stage in flip-flop F1 through the diode 105. Diodes 104 and 105 are poled to present a low impedance to the negative voltage from source 106. The relay PG1 is, therefore, operative in response to the conduction in either of the grounded emitter stages of flip-flop F0 and flip-flop F1.

The equivalent device comprising transistors 83 and 84 will present a very low impedance on conduction to the emitter base circuit of the transistor 100 and will act essentially as a driving stage therefor. The transistor 100 will act as a buffer stage between the relay PG1 and the equivalent device which comprises transistors 83 and 84. Excessive dissipation is avoided by the use of the junction transistor 100 as a buffer stage as the output current path is through the low emitter-to-collector impedance. The use of such buffer stages is described, for example, in the copending application Serial No. 622,646 filed on November 16, 1956, by G. F. Abbott, Jr. and E. E. Sumner. Once a pulse is applied from the diode circuit 52 to the emitter electrode 90 of the transistor 84, the equivalent transistor device will transfer and remain in a state of high conduction and the load current will continue to flow from source 106 to ground through the emitter-collector circuit of the transistor 100. The path of the load current is through the relay PG1 and resistor 107 to ground through the diode 104 and the emitter-collector circuit of transistor 100. The equivalent transistor device 83—84 will be transferred to a state of low conduction, or its other state of operation, upon the application of a reset pulse which is applied to the equivalent base of the device, or the junction of base electrode 86 and collector electrode 85, through the coupling capacitor 108 and across resistor 99. The voltage developed across resistor 99, which is connected between capacitor 108 and ground, is applied to the junction of base electrode 86 and collector electrode 85 through diode 109 and resistor 110. The reset pulse was described above as developed by gate 19. Since the reset pulse is of positive polarity, the application of this pulse to the equivalent base of the composite transistor 83—84 will be effective to reverse bias the emitter electrode 90 with respect to the base electrode 86 and terminate conduction therein.

The state of operation of the bistable element in flip-flop F0 is, therefore, determined by the count information pulse developed through the agency of amplifier 47 and applied through the diode circuit 52 and the reset pulse which is developed by gate 19 and applied through the coupling capacitor 108 to the junction of the collector electrode 85 and the base electrode 86. The state of operation of the bistable element in flip-flop F1 may be transferred similarly in response to either the RS pulse, which is developed by the gate 19, or the pulse which is developed by oscillator 23 and applied thereto through the diode 62. The RS pulse is applied to flip-flop F1 at the emitter electrode corresponding to the emitter electrode 90 of transistor 84 in flip-flop F0. The pulse directed through the diode 62 is applied to flip-flop F1 at the junction corresponding to the junction of collector electrode 85 and base electrode 86 in flip-flop F0.

Making specific reference to FIG. 2, the sequence of operation of flip-flop F0 and flip-flop F1 and the operation of the relay PG1 will be more fully understood. The sixtieth pulse to appear from the binary counter 3 will cause the amplifier 47 to deliver a pulse which is fed through the diode circuit 52. As was described above, the operation of the diode circuit 52 is such that, due to the agency of the digit counter stages BCE and BCF, only every fourth pulse will be fed therethrough. This fourth pulse is represented in FIG. 2 as the sixtieth VF pulse. This pulse is applied to the emitter electrode of transistor 84 and will be operative to cause conduction through the buffer stage comprising transistor 100. Conduction in transistor 100 will cause current to flow from source 106 through the relay PG1. The flip-flop F0 will remain in this conductive state until a reset pulse is applied from the gate 19 to the junction of collector electrode 85 and base electrode 86.

When the flip-flop F0 is transferred to a high conduction state due to the application of the pulse through diode circuit 52, a positive voltage pulse will appear at the emitter electrode 89 of transistor 83. This positive voltage results from the n-p-n transistor 83 operating in a high conduction state and will be applied through the coupling capacitor 111 to the anode of diode 112 across the resistor 113. The application of this pulse will cause diode 112 to become conductive. The pulse directed through diode 112 will develop a voltage across resistor 114 which connects the cathode of diode 112 to ground. The voltage developed across the resistor 114 will operate as a reset pulse for the digit counter stages BCA through BCF. This pulse will be directed along the conductor 115 to the anode of diode 116. The conductor 115 is connected to the binary counter stages BCE and BCF and an appearance of a positive pulse thereon will be effective to reset the stages. The cathode of the diode 116 is connected to the junction of the cathode of diode 51 and the resistor 54. The conduction of a pulse through diode 116 will be effective to develop a voltage across the resistor 54 which will be applied along the conductor 53 to reset each of the binary counters BCA through BCD. The operation of the circuitry above described in connection with the diodes 112 and 116 is effective to insure a proper resetting of each of the digit counter stages BCA through BCF upon the completion of 60 pulses by binary counters 24 and 25.

The reset pulse RS, which is developed by gate 19 is applied to the junction of collector 85 and base 86 of the bistable flip-flop F0 and to the emitter electrode in flip-flop F1 corresponding to the emitter electrode 90 of transistor 84 in flip-flop F0. The application of this pulse in flip-flop F1 transfers it to a state of high conduction so as to drive its associated buffer stage, not shown, to cause conduction therein. The conduction of the buffer stage in flip-flop F1 will continue the current path to ground for the voltage source 106 and is, therefore, effective upon relay PG1. The flip-flop F1 is connected to the junction of the resistor 63 and the cathode of diode 62 through the conductor 117. A pulse directed through the diode 62 and appearing on conductor 117 will be applied to that junction in flip-flop F1 corresponding to the junction of collector electrode 85 and base electrode 86 of flip-flop F0.

As this pulse is positive, it will be effective to transfer the flip-flop F1 from a state of high conduction to a state of low conduction. The sequence of operation of flip-flop F0 and flip-flop F1 is shown in the curves C and D of FIG. 2. The reset pulse resets flip-flop F0 and sets flip-flop F1 simultaneously.

As was disclosed above, the relay PG1 is common to the collector circuit of each of the buffer stages contained in flip-flop F0 and flip-flop F1. The relay PG1 is a slow-operate relay having an operating delay T1 which is greater than the time interval T between the occurrence of the sixtieth VF pulse and the first VF pulse, as shown in FIG. 2. A delayed operation of relay PG1 is required since the buffer stages contained in flip-flop F0 and flip-flop F1 are jointly effective to continuously provide a current path from the voltage source 106 for a period of time equal to T. The circuit arrangement is such that the buffer stage of flip-flop F0 will complete the path to ground from source 106 through relay PG1 for the first half of the time interval T and the buffer stage contained in flip-flop F1 is operative to complete the circuit path during the second half of the time interval T. The delay in operating the relay PG1 will therefore cause the alarm sending circuit 119 to be unaffected by the application of the sixtieth VF pulse, the RS pulse, and the first VF pulse in a proper sequence from flip-flop F0 and flip-flop F1. Curves A and B of FIG. 2 show the proper sequence of the above-mentioned pulses which will not be operative to effect an operation of relay PG1. As the buffer stages in each of the flip-flop F0 and flip-flop F1 will become conductive to complete a circuit path for the PG1 relay whenever the equivalent transistor devices, i.e., transistors 83—84 in flip-flop F0 and the corresponding circuitry in flip-flop F1, are in a state of high conduction, the current through the PG1 relay will flow upon the application of a proper sequence of these pulses only during the time interval T which separates the sixtieth VF pulse and the first VF pulse. The reset pulse RS, which is developed by the gate 19 and shown in curve B, is effective to immediately transfer the current path of the relay PG1 from the flip-flop F0 to the flip-flop F1. The time delay T1 of operation of the relay PG1 should therefore be slightly greater than the time T which separates the sixtieth VF pulse and the first VF pulse so as not to be responsive to a proper sequence of pulses applied to flip-flop F0 and flip-flop F1.

The alarm actuating circuit comprises the relay PG1, the slave relay PGA and the alarm sending circuit 119. Associated with relay PG1 are the contacts or switch devices PG11 and PG12 which are adapted to be closed in response to the actuation of the relay PG1. Upon the actuation of the relay PG1, a locking path is provided therefor through the now closed switch device PG11 to ground through switch device RS2 and the alarm sending circuit 119. The switch device PG12, which is operated simultaneously with the switch device PG11 in response to the relay PG1, will provide an operating path for the slave relay PGA. A current source 118 is provided for the slave relay PGA and the path therefor is from source 118 through the slave relay PGA and the now closed switch devices PG12 and PG11 to ground through the switch device RS2 and the alarm sending circuit 119. Switch device RS2 is normally closed and will be further described hereafter. Any malfunction in the counter 6 or the counters 24 and 25 will cause the relay PG1 to operate and lock, resulting in the operation and locking of PGA relay. Relay PGA controls the operation of the alarm sending circuit 119 to supply appropriate indications of such malfunctionings. Associated with the PGA relay are the normally open switch devices PGA1 and PGA2 which are operative in response thereto. The switch device PGA1 is operative to give a visible indication of any malfunction in the system by completing a circuit path to ground from the voltage source 120 through the lamp 121. The switch device PGA2 is operative to complete a path from the gate 19 through the coupling capacitor 122 and diode 123 to conductor 115 to reset the counters 24 and 25. The diodes 112 and 123 are operative, therefore, as an OR gate so that the counters 24 and 25 may be reset by a pulse developed either by the gate 19 or by the equivalent transistor device 83—84, as has been hereinabove described. The application of the reset pulse from the gate 19 is effective to resynchronize the operation of the counter 6 and the counters 24 and 25. Since the pulse directed through the switch device PGA2 is the same pulse which is used as one of the operational reference pulses and as it occurs intermediate each cyclic operation of the counters 24 and 25, it will be effective to reset the latter to initiate a properly synchronized counting operation by both counters if the failure in the counters is temporary. One of the results of a resynchronization after any type of failure will be to effectively lower the power dissipation of the system.

The arrangement in FIG. 3 is such that a malfunction in either the counter 6 or the counters 24 and 25 will be effective to operate the PG1 relay through the agency of either the flip-flop F0 or the flip-flop F1. Making specific reference to the curves A and B of FIG. 2, a malfunction in the system will cause the RS pulse to be displaced to occur either subsequent to the first VF pulse or prior to the sixtieth VF pulse. It will be recalled that due to the operation of the binary counter 3, the RS pulse developed by the gate 19 normally occurs intermediate the sixtieth VF pulse and the first VF pulse. If the counter 6 is lagging in count with respect to the counters 24 and 25, the RS pulse will occur subsequent to the first VF pulse. The transistor 100, being driven by the equivalent transistor device 83—84 in response to the application of the sixtieth VF pulse, will cause current to flow through the relay PG1 for a time greater than the delay of operation T1 of relay PG1. A subsequent RS pulse will cause a similar operation in flip-flop F1. If, however, the counter 6 is leading in count with respect to counters 24 and 25, the RS pulse will occur prior to the sixtieth VF pulse. The sixtieth VF pulse which appears subsequent to the RS pulse will be effective to cause conduction in the transistor 100 of flip-flop F0 for a period of time greater than that time T1 which is required to actuate the relay PG1. A prior occurring RS pulse will cause a similar operation of flip-flop F1.

Therefore, the occurrence of a RS pulse both prior to the sixtieth VF pulse and subsequent to the first VF pulse will be effective to operate the relay PG1. It is evident that a spurious pulse appearing at any time during the operation of the counter 6 will cause conduction in the buffer stage contained in flip-flop F1 for a time interval greater than that required to actuate the relay PG1. The appearance of a spurious pulse may also cause a temporary failure in the operation of either counter resulting in an improper count by that relay and a displacement of the RS pulse. The operation of the relay PGA in response to the actuation of relay PG1 will be effective to operate switch device PGA2 to resynchronize the operations of the counter 6 and the counters 24 and 25.

FIG. 4 shows a modification of applicant's invention whereby a temporary failure may be distinguished from that which is of a permanent nature. A permanent failure of the system would normally be one wherein an operative element of one of the counters would continue to function improperly resulting in recurring improper counting operations by that counter. A failure of a temporary nature would be one which is caused by a spurious pulse developed within the system which is operative to effect either flip-flop circuit directly or a miscount by one of the counters resulting in the displacement of the RS pulse. This embodiment may be distinguished from that shown in FIG. 3 in that the flip-flop FF0 and flip-flop FF1 are not provided with a common relay but, instead, are each operative to control separate relays PG0 and PG1, respectively. The circuitry contained within the boxes described as flip-flop FF0 and flip-flop FF1 of FIG. 4 are identical to that shown within the dotted enclosure designated flip-flop F0 in FIG. 3. A relay PG1 is connected through the resistor 132 to the flip-flop FF1 at the collector electrode corresponding to collector electrode 103 in the buffer stage of flip-flop F0 of FIG. 3. A voltage source 133, which is connected to the relay PG1, supplies the operating voltage to the collector electrode of the buffer stage contained in the circuitry of flip-flop FF1. Normally opened switching devices PG11, PG12 and PG13 are associated with the relay PG1 which are closed upon the actuation thereof. The operation of the switch device PG12 completes a locking path for relay PG1 from the junction of the relay PG1 and resistor 132 to ground through the switch device RS1. The switch device RS1 is normally closed. Associated with relay PG1 is the relay PGA, which is provided with a voltage source 145. The operation of the switch devices PG11 and PG12 will complete a current path from the source 145 through relay PGA to ground through the switching devices PG11, PG12 and RS1. The switch device PG13 is operative to give a visible indication of the operation of relay PG1 by completing a circuit path to ground from the voltage source 143 through lamp L1. The effect of the operation of the relay PG1 is, therefore, to complete a self-locking path and to actuate and lock the relay PGA. The function performed by the relay PGA is similar to that as has been described in reference to the relay PGA shown in FIG. 3.

Associated with flip-flop FF0 is relay PG0 which is connected thereto from the voltage source 135 and through the resistor 134. The resistor 134 is connected to the collector electrode of the buffer stage contained in flip-flop FF0 corresponding to the collector electrode 103 shown in flip-flop F0 of FIG. 3. A voltage source 135 connected through the relay PG0 supplies the operating voltage to the collector electrode of the buffer stage contained in flip-flop FF1 through the relay PG0 and resistor 134. The operation of the respective buffer stages contained in flip-flop FF0 and flip-flop FF1 will be effective to cause a load current to flow through the relays PG0 and PG1, respectively. Associated with the relay PG0 is a switch device PG01 which is operable in response thereto. A voltage source 136 is shown connected through the resistor 137 to the switch device PG01. The operation of the switch device PG01 will be effective to complete a circuit path from the voltage source 136 through resistor 137 to ground. The junction of switching device PG01 and the resistor 137 is connected through the coupling capacitor 138 to an inhibiting gate 139 and an enabling gate 140. The operation of the switch device PG01 in response to the actuation of relay PG0 will effectively connect the junction of the resistor 137 and the coupling capacitor 138 to ground, resulting in a positive-going voltage being applied to the inhibiting gate 139 and the enabling gate 140. This positive voltage results since the coupling capacitor, which is normally charged to the negative voltage 16, discharges rapidly to ground potential upon the operation of the switch device PG01.

The pulse developed by the discharge of capacitor 138 is blocked by the enabling gate 140 but is conducted through the inhibiting gate 139 to trigger a monostable flip-flop device FF2 causing it to transfer to its unstable state for a period sufficient to allow a subsequent counting operation to be made by the supervisory counters 24 and 25. This pulse directed through the inhibiting gate 139 is also directed through the OR gate 140 to reset flip-flop FF0 for a subsequent comparison. An output pulse developed due to the operation of the flip-flop device FF2 in its unstable state is directed from the output U and applied simultaneously to the inhibiting gate 139 and the enabling gate 140. The application of the pulse from output U is effective to prohibit the conduction of a subsequent pulse applied to the input of the inhibiting gate 139 due to the operation of switch device PG01. However, this same pulse when applied to the enabling gate 140 will permit the conduction of a pulse therethrough. It is evident that two operations of relay PG0 are required to direct a pulse through the enabling gate 140. The second operation of relay PG0 provides a pulse through the enabling gate 140 to the input of the bistable flip-flop device FF3. A biasing potential for the flip-flop device FF3, which may be identical to flip-flop F0 of FIG. 3, is supplied from the voltage source 141 through relay PG2 and the resistor 142. Resistor 142 is connected to the collector electrode of the buffer stage corresponding to the collector electrode 103 of FIG. 3. The pulse directed through the enabling gate 140 is applied to the emitter electrode of the bistable device corresponding to the emitter electrode 90 of FIG. 3. The application of this pulse is effective to cause the bistable device to drive the buffer stage to complete a path to ground for the load current supplied by source 141 and actuate relay PG2. Associated with the relay PG2 are the normally open switch devices PG21, PG22 and PG23. The switch device PG21 is operable in response to the actuation of relay PG2 to complete a path to ground from the junction of resistor 142 and relay PG2 through the switch device RS1. The operation of the switch device PG21 is therefore effective to provide a locking path for the relay PG2. The operation of the switch device PG22 is effective to complete a circuit path from the voltage source 145 through the relay PGA to ground through the switch devices PG21 and RS1 to lock relay PGA. The arrangement as hereinabove described is, therefore, operable to provide for the relay PGA with a second locking path. A lamp L2 is provided to give a visible indication of the operation of relay PG2. Lamp L2 is connected between a voltage source 144 and switch device PG23. The actuation of relay PG2 will, therefore, be indicated through the agency of the switch device PG23 completing a circuit path from source 144 to ground through lamp L2.

The operation of the flip-flop FF0 and the flip-flop FF1 is identical to the operation as was hereinbefore described in respect to the flip-flop F0 of the flip-flop F1 of FIG. 3. The flip-flop FF0 is triggered to a state of high conduction by the sixtieth VF pulse which is directed through the diode circuit 52 in response to the operation of counters 24 and 25. The reset pulse developed by gate 19 is also effective to transfer the operating state of flip-flop FF0 and to effectively trigger flip-flop FF1 to a state of high conduction. The pulse conducted through the diode 62 is likewise effective to transfer the operating state of flip-flop FF1. The application of the sixtieth VF pulse to flip-flop FF0 completes the load current path of the voltage source 135 through the relay PG0 to ground through buffer stage of flip-flop FF0. Relay PG0 will therefore be energized to operate the switch device PG01. It should be noticed, however, that the PG0 relay is not self-locking. It has a delayed operation T1 which is greater than that time interval between the sixtieth VF pulse and the first VF pulse, similar to the operation of the PG1 relay of FIG. 3. Relay PG0 will therefore be operative only to apply a pulse to the inhibiting gate 139 to trigger the monostable flip-flop device FF2 and to apply a reset pulse to FF0. The switch device PG01, upon the relay PG0 deenergizing, opens the circuit path of the voltage source 136 to ground and allows the coupling capacitor 138 to recharge. The application of the pulse to the noninhibited gate 139 will be effective to transfer the operation of the flip-flop FF2 to provide an output pulse at U. The flip-flop FF2 remains operative in its unstable state for that period of time which is required for a subsequent operation of the counters 24 and 25 of FIG. 3. The application of this output pulse from the flip-flop FF2 will, therefore, be effective to both inhibit the passage of a pulse through the gate 139 and to enable the gate 140 during the subsequent counting operation by counters 24 and 25. A second operation of the relay PG0, which has been normalized due to the reset of flip-flop FF0 by OR gate 147, during this period of time will therefore be effective to cause the enabled gate 140 to conduct the pulse developed through the agency of relay PG0 and switch device PG01 in response to an improper sequence of pulses produced by the subsequent counting operation of counters 24 and 25. This second pulse will be applied upon a subsequent failure in the system which is indicative of a permanent type failure. If, however, a second operation of relay PG0 does not result from a subsequent counting operation of counters 24 and 25, the failure in the system is one of a temporary nature and flip-flop FF2 will return to a stable state of operation. A pulse conducted through the enabled gate 140 will be applied to the flip-flop FF3. The circuitry contained in flip-flop FF3 may be identical to that of flip-flop F0 of FIG. 3. This pulse is directed from enabled gate 140 and is applied to the emitter electrode corresponding to emitter electrode 90 of FIG. 3. The presence of the pulse conducted through enabled gate 140 is effective to cause conduction in the buffer stage contained within flip-flop FF3 to provide a load current path from the voltage source 141 to ground through the relay PG2 and resistor 142. The energization of relay PG2 causes the switch device PG21 to complete a locking path from the junction of relay PG2 to ground through the switch device RS1. The operation of relay PG2 will also be effective to close the switch device PG22 to lock relay PGA through the now operated switch devices PG21 and PG22 and switch device RS1. From the circuit arrangement above described, the relay PGA is operatively locked due to the operation of either of relays PG1 or PG2.

As was discussed above in respect to the operation of the relay PG1 in FIG. 3, the flip-flop FF0 and the flip-flop FF1 will be each affected by the presence of a miscount by either the counter 6 or the counters 24 and 25. However, only the flip-flop FF1 will be affected by a spurious pulse developed within the system which does not cause a miscount by either of the counter 6 or the counters 24 and 25. The embodiment which has been described in FIG. 4 is operable to distinguish a temporary failure of operation and the presence of a spurious pulse from the operation of the counters which may be of a permanent nature. It is evident from a consideration of FIG. 2 that the reset pulse RS will be displaced either subsequent to the first VF pulse or prior to the sixtieth VF pulse. Either of these conditions will be effective to cause the actuation of relays PG0 and PG1. The relay PG0 is nonlocking but will be effective to cause a single pulse to be directed to inhibiting gate 139 to transfer the monostable device FF2 to an unstable state of operation and enable gate 140 during a subsequent counting operation. The same condition will, however, actuate relay PG1 which is effective to operate switch device PG12 to close a locking path therefor. The relay PG1 is effective to also operate the switching device PGA and provide a locking path therefor to ground through the associated switching devices PG11 and PG12 and switch device RS1. A switching device PGA2 is associated with relay PGA and is operable in response thereto to apply a pulse from gate 19 to conductor 115 to reset the supervisory counters 24 and 25 of FIG. 3. The operation of switch device PGA2 in response to relay PGA is similar to that of switch device PGA2 of FIG. 3 and is effective to resynchronize the counting operations of the supervisory counters 24 and 25 to the main counter 6.

If the failure was one of a temporary nature, a subsequent counting operation by the counters 24 and 25 will result in the application of a sixtieth VF pulse, a reset pulse, and a first VF pulse to the flip-flop FF0 and flip-flop FF1 in a proper sequence. The relay FG1 and PGA will, however, remain locked to give an indication of the temporary failure through the agency of lamp L1. If, however, the failure is one of a permanent nature, for example the defective operation of a counter element, a subsequent application of the sixtieth VF pulse, the reset pulse, and the first VF pulse will not appear in a proper sequence to the flip-flop FF0 and the flip-flop FF1. The improper sequence of these subsequent pulses will again be effective to operate the PG0 relay associated with flip-flop FF0. The operation of relay PG0 will again cause a pulse to be directed through the coupling capacitor 138 to be applied to the inhibiting gate 139 and the enabled gate 140. As the flip-flop FF2 has been previously triggered due to the first improper sequence of pulses, it will be operating in an unstable state and developing a pulse to inhibit gate 139 and enable gate 140. The application of this pulse will enable gate 140 to conduct a pulse therethrough to operate flip-flop FF3. The operation of the flip-flop FF3 will cause the relay PG2 to become operated. The switch devices PG21 and PG22, which are responsive to relay PG2, will thereupon provide locking paths for relay PG2 and relay PGA. The switch device PG23 will also respond to relay PG2 to give a visual indication of this condition through the agency of lamp L2. It is evident therefore that for the relay PG2A to become operative, two successive failures must be present within the system. A temporary failure will necessarily only occur once due to the resetting of the supervisory counters by relay PGA. It is desirable to maintain the relay PGA operative when the system has permanently failed to a lower dissipation within the system itself.

Upon the correction of any failure present within the system, the entire system will be reset by means of the switch devices RS1 and RS2 which serve a function similar to that of the switch devices RS1 and RS2 of FIG. 3. The switch device RS1 is common to the locking paths of the relays PG1, PG2 and PGA. The switch device RS is normally in a closed position. The breaking of the continuity of the locking paths of these relays by the disengaging of the switch device RS1 therefore normalizes each of the relays PG1, PG2 and PG3. Switch device RS2 is normally in an open position and is effective upon closing to resynchronize the operations of the main counter and the supervisory counter by completing a path from the AND gate 19 to the conductor 115 in a manner described above.

The above described circuit arrangements are illustrative of the application of the principles of this invention. Numerous other arrangements may be devised by one skilled in the art without departing from the spirit and scope of the invention.

What is claimed is:

1. In combination, a source of counting pulse; a source of reset pulses; a first cyclic counter to be continuously checked driven by said counting pulses; and an alarm circuit comprising a second cyclic counter having a radix different from the radix of said first counter, said second counter being driven by said counting pulses and said reset pulses, an irregularity indicating device, first means effective after each cyclic operation of said second counter for initiating the operation of said indicating device, second means effective within a predetermined interval upon the reception of a reset pulse for disabling said first means and for reinitiating the operation of said indicating device, and third means effective within a predetermined interval upon the reception of a count pulse for disabling said second means.

2. In combination, a first cyclic counter, a second cyclic counter, a first control device associated with said first counter, a second control device associated with said second counter, means responsive to either one of said first and said second control devices for providing an alarm indication after a predetermined delay interval, means responsive to each cyclic operation of said first counter for operating said first control device, means effective during said delay interval following the operation of said first control device and responsive to each cyclic operation of said second counter for inhibiting the operation of said first control device so that said alarm indicating providing means is not operated thereby, means effective when the operation of said first control device is inhibited for actuating said second control device, and means responsive to the initiation of a subsequent cyclic count of said first counter after the operation of said second control device and during said delay interval following the operation of said first control device for inhibiting the actuation of said second control device.

3. In a combination in accordance with claim 2 including means operable in response to said alarm providing means to reset said second cyclic counter.

4. In a combination in accordance with claim 3 including means effective after said alarm means is operated for maintaining said alarm means in an operated condition after said second counter is reset.

5. In a system for monitoring the operation of a counting chain, a first cyclic and a second cyclic counter with each having a different radix of operation and comprising M counter stages and N counter stages, respectively, M and N being different integral numbers, each of said first and said second counters being operative to cyclically count the pulses in a train of serially arranged pulses, said first counter including means operable at the completion of each cyclic operation to transmit a first reference pulse, said second counter including means operable at the completion of each cyclic operation to transmit a second reference pulse, a device responsive to either one of said first and said second reference pulses for providing an alarm indication after a predetermined delay interval, and means operable in response to the initiation of a subsequent cyclic operation of said second counter within said predetermined interval to inhibit said alarm device.

6. In combination, a first source of a first series of pulses, a second source of a second series of pulses having a repetition frequency smaller than the repetition frequency of said first series of pulses, accumulating means operative to derive a reference pulse for each accumulation of a predetermined number of pulses of said first series, an alarm device having a delayed operation greater than the repetition frequency of said first series of pulses, a first control means responsive to said reference pulses for operating said alarm device, a second control means responsive to each pulse of said second series for operating said alarm device, a first means responsive to each pulse of said second series of pulses and operative to disable said first control means, and a second means responsive to the initiation of each accumulation by said accumulating means to disable said second control means.

7. In an apparatus for monitoring the cyclic operation of a counting chain, a supervisory cyclic counter having a radix different from the radix of said counting chain, means operative upon the completion of each cyclic operation of said chain to transmit a first control pulse and upon the completion of each cyclic operation of said counter to transmit a second control pulse, a first means having a first and a second state of operation, a second means having a first and a second state of operation, an alarm circuit responsive to said first means and to said second means when operating in said first state, a first control means operative to transfer said first means to said first state in response to said second control pulse and to said second state in response to said first control pulse, a second control means operative to transfer said second means to said first state in response to said first control pulse and to said second state in response to the initiation of the next cyclic count by said second counter, and delay means operable to delay the operation of said alarm device for a predetermined period of time whereby said device does not operate if both said first means and said second means are returned to said second state.

8. In an apparatus as recited in claim 7 wherein said first and second means are bistable multivibrator devices.

9. In combination, a first source of a first series of pulses, a second source of a second series of pulses, means for deriving a reference pulse upon the occurrence of a predetermined number of pulses in said first series, a first storage means responsive to be actuated by said reference pulse and disabled by a pulse in said second series, a second storage means responsive to be actuated by said pulse in said second series and disabled by the first pulse in said first series following the generation of said reference pulse, and an indicating device responsive to the actuation of either of said first or said second storage devices for a predetermined interval of time.

10. In combination, an alarm indicating device, a first source of a first series of pulses having a first repetition frequency, a second source of a second series of pulses having a second repetition frequency lower than said first repetition frequency, means for accumulating a predetermined number of pulses of said first series and operative thereupon to transmit a reference pulse, means responsive to said reference pulse and to the pulses of said second series for operating said alarm device, and means operative to inhibit said alarm device if said pulses of said second series occurs subsequent to said reference pulse and prior to the next successive operation of said accumulating means.

11. In combination, a first source of a first train and a second source of a second train of serially arranged pulses having different repetition frequencies, accumulation means responsive to the pulses of said first train and operable to generate a first reference pulse upon the initiation and a second reference pulse upon the completion of each accumulation operation, a first means responsive to said second pulse, a second means responsive to one of the individual pulses of said second train of pulses, means responsive to said one of the individual pulses of said second train of pulses and to said first pulse to inhibit said first means and said second means, respectively, and an indicating device responsive to the continued operation of either one of said first or said second means for a predetermined interval of time.

12. In combination, a source of a serially arranged train of pulses, a first counting device having a first radix of operation and comprising M counter stages, a second counting device having a second radix of operation equal to said first radix and comprising N counter stages, M and N being integral counters, a steering device to direct alternate pulses in said train to said first counting device and to said second counting device, means for supplying a first reference pulse upon the completion of each counting operation of said first counting device, means for supplying a second reference pulse upon the initiation and a third reference pulse upon the completion of each counting operation of said second counting device, first means for storing an indication of said first reference pulse, means controlled by said third reference pulse for resetting said storage means, second means for storing an indication of said third reference pulse, means controlled by said second reference pulse for resetting said third pulse storage means, and means effective if either one of said storage means is not reset within a predetermined interval for providing an alarm indication.

13. In a combination as set forth in claim 12 including means responsive to said alarm providing means to reset said second counter device.

14. In a system for monitoring the operation of a counting device, a source of a serially arranged train of pulses, a first and a second cyclic counter device responsive to alternate pulses in said train of pulses and having different radices of operation, each of said first and second devices including means operable to produce a reference pulse upon the completion of each counting operation, a first means responsive to a successive predetermined number of said reference pulses from said first device, a second means responsive to each of said reference pulses from said second device, a first control means responsive to said second reference pulse to inhibit said first means, a second control means responsive to the initiation of a counting operation by said first counting device to inhibit said second means, a first and a second alarm device responsive within a predetermined interval of time to said first and said second means, and third means responsive to said first or said second alarm device to reset said second counter device.

15. In a system for monitoring the operation of a counting device as set forth in claim 14 wherein said first and said second counting devices each comprise M counter stages and N counter stages, respectively, M and N being integral numbers.

16. In a system for monitoring a main cyclic counting device, a supervisory cyclic counting device having a radix of operation different from the radix of operation of said main counting device, said main counting device operable to produce upon the initiation of each counting operation a first reference pulse and upon the completion of each counting operation a second reference pulse, said first reference pulse of one cycle and said second reference pulse of the preceding cycle being separated by a time interval T, means for producing a third reference pulse upon the completion of each counting operation of said supervisory counting device, means for delaying said first reference pulse and said second reference pulse so that said third reference pulse occurs therebetween during the time interval T, and means effective if said third reference pulse does not occur between said first and said second reference pulses during the interval T.

17. In a system for monitoring the operation of a main counting device, a supervisory counting device having a radix different from that of said main counting device, each of said main and said supervisory counting devices operable to transmit a control pulse at the completion of each counting operation, a first means responsive to said pulse from said main counter, a second means responsive to said pulse from said supervisory counter, an alarm indicating device responsive to said first and said second means, and means effective within a predetermined period of time after said control pulse is transmitted from said main counting device in response to said pulse from said supervisory device to disable said alarm device.

18. In a system for monitoring the operation of a main counting device, a supervisory counting device having a radix different from that of said main counting device, each of said main and said supervisory counting devices operable to produce upon the completion of each counting operation a check pulse, a first means responsive to said check pulse from said main counting device, a second means responsive to said check pulse from said supervisory counting device, a first indicating device responsive after a predetermined period of time to said first means, a second indicating device responsive after a predetermined period of time to said second means, a first control means responsive to said check pulse from said supervisory device during said predetermined period to inhibit said first indicating device, and a second control means responsive to the initiation of a counting operation by said main counting device during said predetermined period to inhibit said second indicating device.

19. In a system for monitoring the operation of a counting device as set forth in claim 16 including in addition means responsive to said check pulse from said main indicating device to reset said supervisory counting device.

20. In combination, a source of pulses to be counted, a first cyclic counter operative to count said pulses, a second cyclic counter operative to count said pulses, an indicating device, a first means responsive to each cyclic operation of said second counter effective to initiate the operation of said indicating device, a second means responsive to each cyclic operation of said first counter and effective within a predetermined interval of time after the operation of said first means to disable said first means and to reinitiate the operation of said indicating device, and a third means responsive to the initiation of each cyclic operation of said second counter and effective to disable said second means within said predetermined interval of time after the operation of said second means.

21. In combination, a source of sets of counting pulses; a source of reset pulses; a first cyclic counter to be continuously checked driven by said counting pulses and said reset pulses; and an alarm circuit comprising a second cyclic counter having a radix different from the radix of said first counter, said second counter being driven by said count pulses and said reset pulses, an irregularity indicating device, first means effective after each cyclic operation of said second counter for initiating the operation of said indicating device, second means effective within a predetermined interval upon the reception of a reset pulse for disabling said first means and for reinitiating the operation of said indicating device, third means effective within a predetermined interval upon the reception of a count pulse for disabling said second means, means effective upon the reception of each reset pulse for synchronizing said second cyclic counter with said first cyclic counter, and means for registering an indication of the operation of said indicating device during two successive cyclic operations of said first counter.

22. In combination, normally synchronized first and second cyclic counters, said second cyclic counter including a first and a second binary-type counter, a first gating device responsive to said first binary-type counter for supplying count information to said second binary-type counter, a second gating device responsive to said second binary-type counter for supplying a first control pulse at the end of each cyclic operation of said second cyclic counter, a third gating device responsive to said first and said second binary-type counters for supplying a second control pulse at the beginning of each cyclic operation of said second cyclic counter, means effective when said first and said second cyclic counters are not synchronized for providing an alarm indication, a first control means responsive to said first control pulse from said second gating device for initiating the operation of said indicating means, a second control means responsive to said first cyclic counter for initiating the operation of said indicating means, and disabling means jointly responsive within a predetermined interval of time to said second control pulse from said third gating device and said first cyclic counter to prevent the operation of said indicating means whereby said indicating means are not operated during a synchronized operation of said first and second cyclic counters.

23. In combination, a first counter device, a second counter device having a number of counting stages different from said first counter device, said second counter device including a third and a fourth counter device, a first gating device responsive to said fourth counter device to supply a first reference pulse, a second gating device responsive to said third and fourth counter devices to supply a second reference pulse, an indicating device, a first control means responsive to said first reference pulse and effective to operate said indicating device after a predetermined interval of time, a second control means responsive to said first counter device and effective to operate said indicating means after a same predetermined interval of time, a first means responsive to said first counter to disable said first control means within said predetermined interval of time, and a second means responsive to said second reference pulse to disable said second control means within said predetermined interval of time.

24. In combination, a first cyclic counting chain, a second cyclic counting chain, a source of pulses to be counted by said first and said second counting chains, means for delaying said pulses to be counted by said second counting chain with respect to said pulses to be counted by said first counting chain, alarm means responsive to the completion of a counting operation by either said first and said second counting chains, and means operative to inhibit the operation of said alarm means if the completion of a counting operation by said second counting chain is interlocated between the completion and initiation of subsequent counting operations of said first counting chain.

25. The combination as recited in claim 24 wherein said alarm device has a predetermined delayed operation.

26. The combination as recited in claim 24 wherein said first and said second counting chains comprise M and N counter stages, respectively, M and N being different integral numbers.

27. In combination, a first cyclic counting chain, a second cyclic counting chain, said second counting chain having a delayed operation with respect to said first counting chain, a source of pulses to be counted by said first and said second counting chains, alarm indicating means, and means for operating said alarm means if the completion of a counting operation by said second counting chain does not occur between the completion and initiation of subsequent counting operations of said first counting chain.

28. The combination as recited in claim 27 wherein said first and said second counter chains each comprise M and N counter stages, respectively, M and N being integral numbers.

29. The combination as recited in claim 27 wherein said first and said second counting chains are arranged to count a same number of said pulses.

30. In combination, a first cyclic counter and a second cyclic counter, said second cyclic counter having a delayed operation with respect to said first cyclic counter, a first alarm indicating device, means for operating said first alarm device if the completion of a cyclic operation of said second counter does not occur intermediate the completion and initiation of succeeding cyclic operations of said first counter, means for synchronizing the counting operations of said first and second counters, a second alarm indicating device responsive to said operating means to be conditioned to operate for a predetermined interval of time, and means for operating said second alarm indicating device if the completion of a subsequent cyclic operation of said second counter does not occur intermediate the completion and initiation of succeeding cyclic operations of said first counter subsequent to the operation of said operating means and during said predetermined interval of time.

31. The combination as set forth in claim 30 wherein said first cyclic counter and said second cyclic counter each comprise M counting stages and N counting stages, respectively, M and N being different integral numbers.

32. In combination, a first cyclic counter and a second cyclic counter having a normally synchronized operation, said first cyclic counter and said second cyclic counter comprising M and N counting stages, respectively, M and N being different integral numbers, said first and said second counters being operative to count a same number of pulses, means for resynchronizing the operation of said first and said second counters, first means responsive to a non-synchronous operation of said first and said second counter to provide an indication thereof, and second means responsive to a subsequent non-synchronous operation of said first and said second counters, said second means being operative to distinguish between a permanent failure and a temporary failure of said synchronous operation of said first and said second counters to provide an indication thereof.

33. The combination as set forth in claim 32 wherein said second counter has a delayed operation with respect to said first counter, said delayed operation being less than the time separation between individual pulses to be counted.

References Cited in the file of this patent

UNITED STATES PATENTS

| | | |
|---|---|---|
| 2,589,465 | Weiner | Mar. 18, 1952 |
| 2,716,230 | Oliwa | Aug. 23, 1955 |
| 2,789,759 | Tootill et al. | Apr. 23, 1957 |
| 2,819,457 | Hamilton et al. | Jan. 7, 1958 |
| 2,896,848 | Miehle | July 28, 1959 |
| 2,919,854 | Singman | Jan. 5, 1960 |